United States Patent [19]
Booty et al.

[11] 3,885,797
[45] May 27, 1975

[54] PHONOGRAPH

[75] Inventors: Donald J. Booty; Charles F. Vandervelde, both of Frankfort, Ill.

[73] Assignee: LCA Corporation, Philadelphia, Pa.

[22] Filed: Oct. 3, 1973

[21] Appl. No.: 402,933

[52] U.S. Cl. .................. 274/2; 40/28.2; 40/106.53; 84/464; 240/3.1; 240/10.1
[51] Int. Cl. ............................................ G11b 1/04
[58] Field of Search ........ 274/2; 40/106.52, 106.53, 40/28.1, 282; 240/10.1, 2 G, 3.1, 2.12

[56] References Cited

UNITED STATES PATENTS

| | | | |
|---|---|---|---|
| 1,445,977 | 2/1923 | Shephard | 240/10.1 |
| 1,487,156 | 3/1924 | Foley | 274/2 |
| 1,796,903 | 3/1931 | Wheeler et al. | 240/10.1 |
| 1,869,276 | 7/1932 | Precourt | 240/10.1 |
| 2,074,249 | 3/1937 | Bloh | 40/106.53 |

*Primary Examiner*—Richard E. Aegerter
*Assistant Examiner*—John W. Shepperd
*Attorney, Agent, or Firm*—Seidel, Gonda & Goldhammer

[57] ABSTRACT

The turntable of a portable phonograph creates psychedelic light patterns as the turntable rotates.

4 Claims, 4 Drawing Figures

PHONOGRAPH

BACKGROUND OF THE INVENTION

The invention relates to the field of phonographs of the type having a rotatable turntable and means for creating patterns of light as the turntable rotates. Devices of this general nature are known, see U.S. Pat. No. 1,487,156 wherein color or hue from a rotatable color filter plate imparts a distinctive hue or color to the cabinet.

The phonograph of the present invention includes a housing having a conventional rotatable turntable. The housing is provided with a removable translucent cover. The housing and cover are preferably semispherical in shape but other geometric shapes may be used.

The upper surface of the housing is defined by a stationary annular cover disc and a centrally disposed rotatable turntable. A second rotatable disc is disposed below the cover disc. The second disc is preferably attached to the turntable for rotation therewith at the same speed. Each disc has opaque portions and light transmitting zones. The light transmitting zones are preferably of different configurations which partially overlap as the second disc rotates.

For the purposes of this disclosure, the stationary cover disc has radially disposed light transmitting zones and the rotatable disc has spirally disposed light transmitting zones. The zones are preferably multicolored. A light source is provided in the housing and preferably is activated whenever the turntable is rotating. As the turntable rotates, a psychedelic light pattern is displayed on the walls and ceiling of the room. If the cover is on the housing, said light patterns are visible in the cover which refracts the light with a pinwheel effect. The light pattern in combination with the music has a soothing, artistic mood effect. The light pattern is also a reminder that the operator has forgotten to shut off the phonograph.

SUMMARY OF INVENTION

A phonograph is provided in the form of a housing having a removable cover with a rotatable turntable supported within the housing. The housing includes first and second discs adjacent the plane of the turntable. One of said discs is rotatable about the axis of the turntable. Each disc has spaced light transmitting zones of dissimilar configuration which partially overlap the different rotative positions of the rotatable disc. An illumination means if provided within the housing below the discs for projecting light upwardly through the overlapping zones on the discs.

It is an object of the present invention to provide a novel phonograph which creates psychedelic light patterns as the turntable rotates.

It is another object of the present invention to provide a small portable phonograph having a modern shape and which emits psychedelic light patterns.

It is another object of the present invention to provide a phonograph which has a reminder to indicate that the turntable is still rotating and has not been shut off.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIG. 1 a phonograph in accordance with the present invention designated generally as 10.

Figure 1:
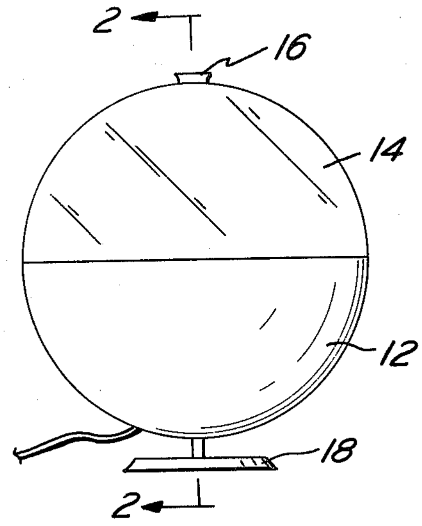
FIG. 1 is an elevation view of a phonograph in accordance with the present invention.

The phonograph 10 includes a housing 12 and a removable cover 14. Each of the housing and cover are preferably semispherical so as to provide the phonograph with a modernistic shape. Other geometrical shapes may be used as desired. The cover 14 is provided with a handle 16. The housing 12 is mounted on a base 18.

The upper surface of the housing 12 is defined by a stationary cover disc 22. Disc 22 is annular and has its periphery secured to the upper edge of the semispherical housing 12. Cover disc 22 is located approximately at a diameter of the spherical phonograph 10 and is horizontally disposed. A turntable 20 which may be of conventional construction extends through the central opening in the cover disc 22 and is driven by a motor 24. Motor 24 may be supported within the housing 12 by a bracket 26.

A disc 28 is rotatably mounted within the housing 12 below the elevation of the disc 22. Disc 28 is preferably annular and made rotatable by being releasably secured to the bottom surface of the turntable 20. The diameter of disc 28 is slightly smaller than the diameter of the disc 22.

Figure 4:
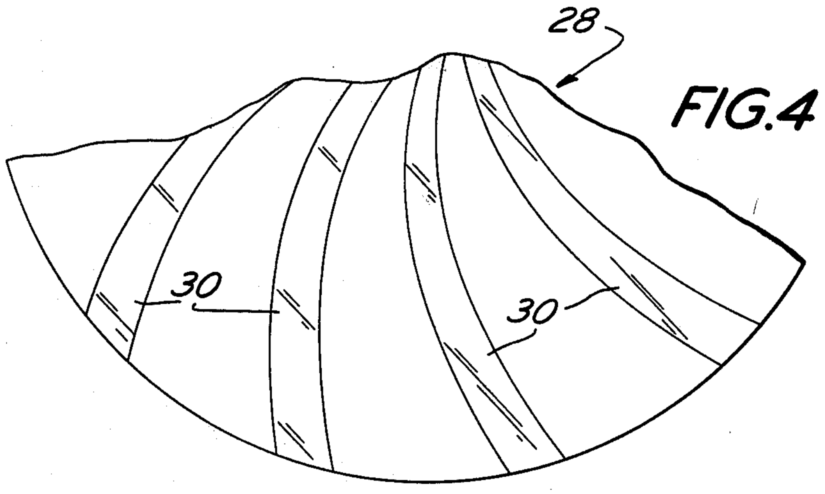
FIG. 4 is a partial plan view of a surface of the rotatable disc.

Each of the discs 22 and 28 have a pattern of light transmitting zones. For purposes of illustration, the disc 28 as shown in FIG. 4 has spirally disposed light transmitting zones 30. Likewise, disc 22 has radially disposed light transmitting zones 32. The light transmitting zones 30 and or 32 may be attained in a wide variety of manners. Said zones are preferably obtained by using transparent polymeric plastic material which have been masked off with portions thereby leaving the light transmitting zones. Thereafter, the light transmitting zones are tinted different colors. The provision of light transmitting zones in this manner is preferred over providing slots in the discs.

Figure 3:
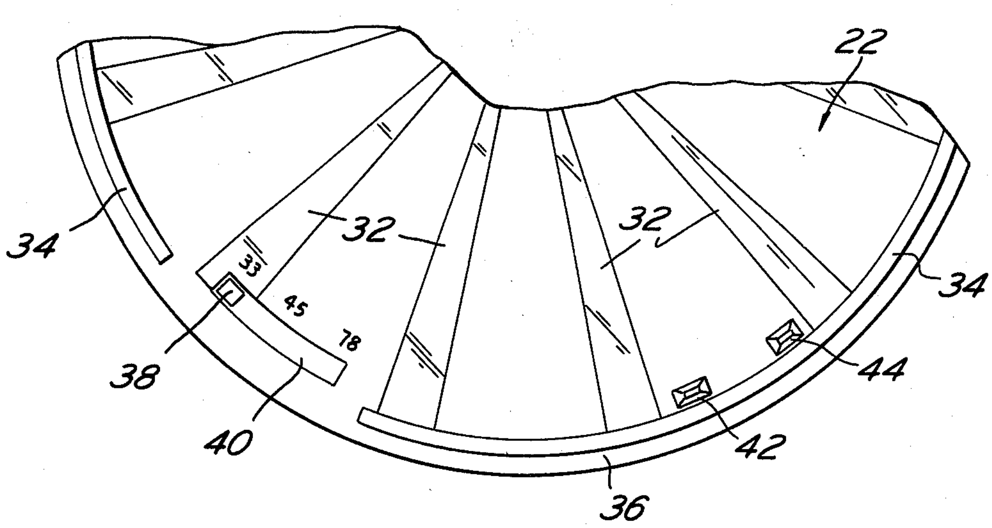
FIG. 3 is a partial plan view of the upper surface of the housing.

The upper surface of the housing 12 includes a peripheral flange 34 which defines an annular rim 36 on which the lower surface of the cover 14 is retained and supported in the assembled disposition of the phonograph. Flange 34 may be integral with the disc 22. As shown in FIG. 3, the flange 34 is interrupted so as to provide a slot 40. A speed selector member 38 is movable along the slot 40 to adjust the speed of the turntable 20 so that its speed is compatible with that of the record being played. As shown in FIG. 3, on-off selector switches 42 and 44 are provided.

Figure 2:
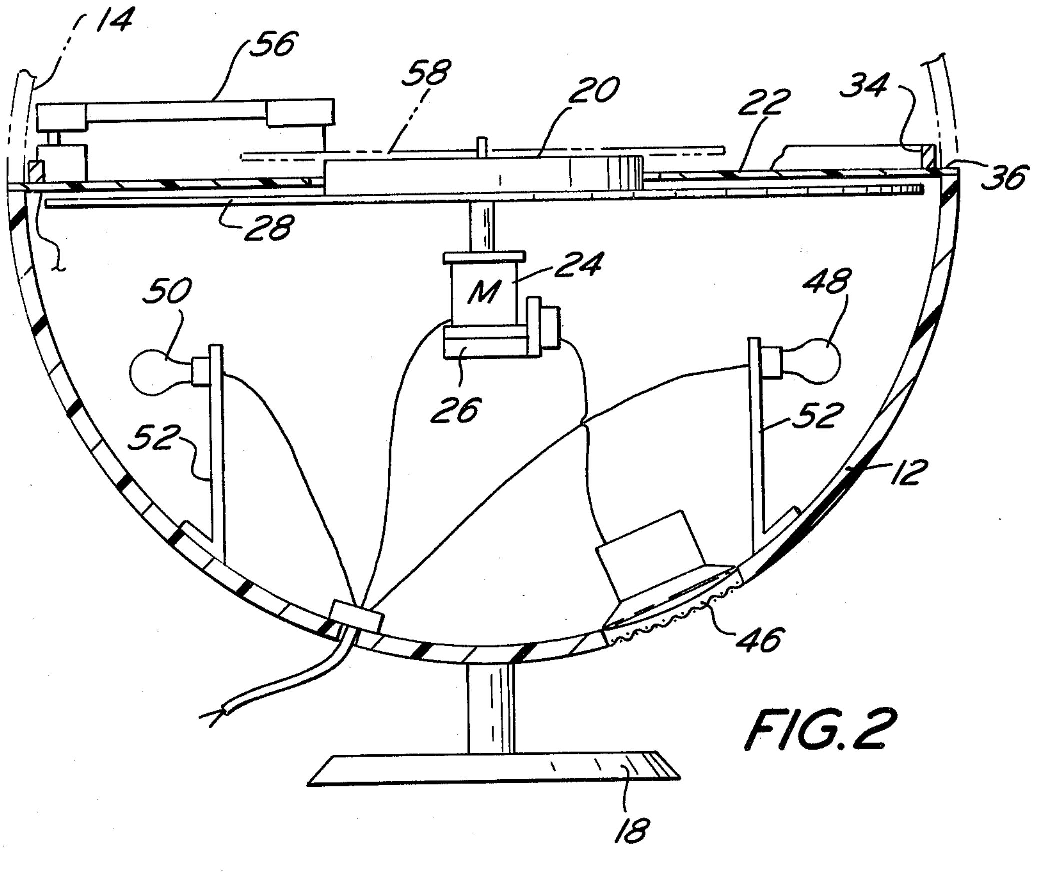
FIG. 2 is a sectional view taken along the lines 2—2 in FIG. 1.

Referring to FIG. 2, a radio 46 may be mounted within the housing 12 with its speaker juxtaposed an opening in the housing 12. First and second illumination means 48 and 50 are provided within housing 12. A greater or lesser number of such means may be utilized as desired. Illumination means 48 is supported by a bracket 52. Illumination means 50 is supported by a bracket 54. A conventional arm 56 is utilized for cooperation with a record 58 shown in phantom on the turntable 20.

The motor 24, illumination means 48 and 50, and the arm 56 are in series with switch 42. Radio 46 and switch 44 are in series with each other.

The phonograph 10 may be used with or without the cover 14 in the assembled disposition as shown in FIG. 1. When switch 42 is activated, the turntable 20 and disc 28 rotate at the same speed. Also, illumination means 48 and 50 are activated. For efficiency of light transmission, the inner surface of housing 12 is preferably a reflective surface so that all light is projected upwardly through the overlapping, constantly changing, zones 30 and 32. Due to the constant changing of position or overlap of the zones 30 and 32, and the different colors of the respective zones, there is projected a psychedelic light pattern on the walls and ceiling. When the cover 14 is present, it refracts the light patterns with a pinwheel effect.

The turntable 20 and disc 28 continue to rotate until the on-off switch 42 is manipulated to an off position. Hence, the continuity of the psychedelic light pattern is an indicator that the turntable 20 is rotating and that the phonograph 10 has not been shut off.

While the speed selector and the on-off switches have been shown on the upper surface of the housing 12, they may be located at other areas as desired. When these devices are located as illustrated, the spherical geometric shape of the phonograph 10 is uncluttered and uninterrupted. The radio 46 is an optional feature which has its own on-off switch 44. By manipulating both switches 42 and 44 to the on position, the psychedelic light pattern will be emitted while the radio is playing.

The cover 14 is preferably a transparent or translucent polymeric plastic material. The housing 12 is preferably made from an opaque plastic material having a light reflective coating on its inner surface.

At least one of the zones 30, 32 is non-radial. In this manner, the overlap of the zones 30, 32 appears to move radially outwardly. The width of zones 30, 32 is narrow so that a plurality of zones 30 overlap one of the zones 32 at any given time.

The present invention may be embodied in other specific forms without departing from the spirit or essential attributes thereof and, accordingly, reference should be made to the appended claims, rather than to the foregoing specification as indicating the scope of the invention.

We claim:

1. A phonograph in combination with an opaque housing having a removable cover, a rotatable turntable horizontally supported by said housing for rotation about a vertical axis and adapted to support a phonograph record, motor means supported by said housing for rotating the turntable at different selected speeds, first and second discs, said first disc being on said housing horizontally disposed adjacent the plane of said turntable, said discs having an outer diameter greater than the outer diameter of said turntable, said first disc being annular and stationary, said first disc having a centrally disposed hole through which a portion of said turntable extends, means for rotating said second disc with said turntable at the same speed, a phonograph arm supported by said housing and movable to a position over said turntable for contact with a phonograph record adopted to be supported by said turntable, each of said discs having spaced light transmitting zones in a portion thereof which is radially outwardly from the outer periphery of said turntable and which partially overlap at different rotative positions of said second disc, said zones on at least one of said discs being multicolored, and illuminating means in said housing for simultaneously projecting light upwardly from the housing about the periphery of the turntable through a plurality of said partially overlapping zones on said discs.

2. A phonograph in accordance with claim 1 wherein said housing and cover are each semipherical.

3. A phonograph in accordance with claim 2 wherein said cover is translucent, and a base connected to said housing for supporting the same from below.

4. A phonograph in accordance with claim 1 wherein said discs are of approximately the same outer diameter, said first disc being at an elevation above said second disc, said zones on said first disc being radially disposed and the zones on the second disc being spirally disposed, adjacent zones on said second disc being of different colors, and the width of said zones increasing in a direction from the axis of rotation of the turntable toward the periphery of said disc.

* * * * *